United States Patent Office.

DECIUS W. CLARK, OF CHICAGO, ILLINOIS.

Letters Patent No. 100,725, dated March 15, 1870.

IMPROVED ENAMEL FOR CLAY GAS-RETORTS, BURNERS, TILES, &c.

The Schedule referred to in these Letters Patent and making part of the same.

To all whom it may concern:

Be it known that I, DECIUS W. CLARK, of Chicago, in the county of Cook, and State of Illinois, have invented an Improved Enamel for Clay Retorts, Carbon Burners, Tiles and Fire-Brick Crucibles, and Stove-Lining, and for other purposes; and I do hereby declare that the following is a full and exact description thereof, which will enable those skilled in the art to make and use the same, reference being had to the following described ingredients, of which it is composed.

What I claim in the present invention is preventing carbonaceous incrustations from forming on the interior of clay retorts, thereby increasing the durability of the retorts for an indefinite period of time, as well as enlarging their productiveness.

Clay retorts are more or less porous, and therefore leaky, and by exposure to the high heat required they commence to shrink from the time they are first heated, and continue to do so during their use, thus disintegrating the particles of clay and producing innumerable small cracks. By enameling the clay retorts on the interior I prevent this porosity and leakage, and by so doing I prevent the retorts from cracking.

This accumulation of carbon on the inside of retorts not only acts as a non-conductor of heat to the coal, but it also diminishes the capacity of the retorts to receive the usual charge of coal, and, consequently, small charges must be made, involving a smaller product of gas. The desideratum at present is to prevent this excess of carbon from accumulating on the interior of the retorts. This I do by my enamel, and then a clay retort becomes all that can be desired for the purpose of generating gas.

Several gas companies have used clay retorts without an exhauster, but have discontinued their use as unprofitable because of the loss by leakage and the destruction of the retorts by the excess of carbon. But retorts properly enameled will work satisfactorily without an exhauster.

Having stated the chief difficulties experienced in the use of clay-retorts, I now present a remedy for them all in my enamel, and claim for it the following advantages:

First, the carbon is prevented from accumulating in the interior of the retorts.

Second, the durability is prolonged for an indefinite period of time, and the loss of gas by leakage prevented.

Third, the simple and convenient application of the enamel, and the diminished expense of the process as compared with the present plan for the removal of the carbon.

First, to make the frit for the enamel, I use one hundred pounds of feldspar; seventy-five pounds of silex, or, if the frit is for a dark enamel, seventy-five pounds of soapstone may be used instead of silex; fifty pounds of boracic acid, or, in lieu of the latter, forty pounds of borax, or seventy-five pounds of cryolite, the three articles producing, in the several quantities given, about the same result; fifty pounds oxide of zinc or oxide of tin; sixty-five pounds Paris white; sixteen pounds China clay. The whole is then put into a clay (sogger) vessel and melted; and after the mass has cooled it is first pounded fine, and then ground to a fine powder on a potter's glazed pan, and afterward dried.

Enamel No. 1.

To make white enamel, take of the above-described frit, fifty pounds; fifty pounds feldspar; fifty pounds silex; fifty pounds cryolite; thirty-two pounds China clay. Grind these ingredients well together in water to about the consistency of cream. The retorts are then coated with the compound, by means of a force-pump or a like device, ejecting the compound onto the surface, after which the retort is subjected to a heat of about 2,800° Fahrenheit. This operation will produce a hard and glossy enameled surface, which will remain clean and smooth for a long time when the retort is used in the manufacture of gas.

Enamel No. 2.

If the enamel is to be dark colored, take of the above-described frit, one pound; powder blue, quarter pound; silex, half pound; black oxide of manganese, half pound, and grind them in water to about the consistency of cream. Then add about eight pounds of what is known as Albany slip, or add a like article.

The water used should be so much as will make the compound weigh twenty-eight ounces to the pint. Then of well-burned clay, ground to a fine powder, take two pounds, and add one pound of fire-clay unburned. Mix the whole in so much water that the compound will weigh twenty-eight ounces to the pint. Then to four parts of the former compound add one part of the latter compound. Mix well together, and the composition is ready to apply to the retorts and other articles, which should be heated to about 3,400° Fahrenheit.

Fire-clays in different localities differ very much in their capacity to resist heat, some of them requiring much more heat to thoroughly fuse and cement the enamel, and also to form a proper body for a retort. But a sufficient guide will be had when No. 1 Woodbridge clay (N. J.) is taken as a basis for heating when the enamel is to be fused and retort to be suitably burned.

For the clay that stands the greater heat use enamel No. 2; but for the clay that stands the lesser heat use enamel No. 1. For enameling stone linings, crucibles, and fire-flues, I use No. 2. Only increase the manganese, silex, and burned fire-clay described in No. 2, and by that means the enamel can be made to stand a sufficient heat, 3,000° to 8,000° Fahrenheit.

In the above specification I have given the certain proportions of the several ingredients used; but the proportions may be changed and yet produce a good enamel.

Having thus described my invention,

What I claim, and desire to secure by Letters Patent of the United States, is—

1. The combination of the ingredients herein named for making the frits, when they are compounded as set forth.

2. The combination of the frits with the ingredients described in No. 1, compounded as set forth.

3. The combination of the frits with the ingredients described in No. 2, compounded substantially as described.

DECIUS W. CLARK.

Witnesses:
G. L. CHAPIN,
JOHN ATKINSON, Jr.